Patented Apr. 8, 1930

1,753,478

UNITED STATES PATENT OFFICE

ROBERT D. PIKE, OF OAKLAND, CALIFORNIA

METHOD FOR MANUFACTURE OF DI-CALCIUM PHOSPHATE

No Drawing. Application filed November 14, 1927. Serial No. 233,322.

My present invention relates to an improved method for utilizing by-product hydrochloric acid for decomposing phosphate rock and for obtaining ammonium citrate soluble, or available di-calcium phosphate from the resulting solutions.

In my co-pending applications Serial Number 228,177 filed October 24, 1927, and Serial Number 228,178, filed October 24, 1927, I have shown apparatus and processes for combining phosphoric acid and potassium chloride with production of by-product hydrochloric acid gas, which is mixed with gases of combustion.

In my present process I bring this mixture of gases of combustion and hydrochloric acid gas into direct contact with ground phosphate rock which is suspended in water. This may be done in any suitable form of well known apparatus such, for example, as a tray bubble tower, but I find it preferable to use apparatus similar to that described in my above mentioned co-pending application Serial Number 228,177. In utilizing this apparatus the hydrochloric acid laden gases of combustion at a temperature of 300°–500° centigrade are caused to flow by the rotating graphite blades which are utilized for stirring the water suspension of pulverized phosphate rock. Heat is transferred to these blades and the film of water which covers them absorbs HCl. The net result is a rapid and efficient decomposition of the phosphate rock.

As an example of this step of my process, consider the use of a western phosphate rock in which the ratio of CaO to $P_2O_5$ is 1.493/1. It is preferable to grind this rock so that 80% is less than 100 mesh and then to roast in a mechanical externally fired roaster at a temperature of 600°–700° C. Pulverized roasted rock is mixed with water and passed through the apparatus for contacting with the HCl gas. It is preferable to employ from three to four parts by weight of water to one part by weight of the pulverized rock. The apparatus should be so proportioned that the suspension of phosphate rock and water is kept in contact with the HCl gas for not less than six hours. As a result of this reaction over 95% of the $P_2O_5$ goes into solution and the liquid is separated from the silicous residue by any suitable well known means. The clarified solution contains from five to seven per cent of $P_2O_5$, depending upon the raito of water to roasted rock and upon the $P_2O_5$ content of the later. The ratio of $P_2O_5$ as mono calcium phosphate to the $P_2O_5$ as phosphoric acid is about 2.64 to 1. There is from 1 to 1.5% of free HCl in the solution.

Fox and Whittaker, Jour. Ind. Eng. Chem. 19, 349 (1927) state that if calcium carbonate is used to effect precipitation of such a solution, a considerable amount of non-available tricalcium phosphate is formed. I have found that if I neutralize the free hydrochloric acid and the first hydrogen ion of the free phosphoric acid present with calcium carbonate, and then preciptate the remaining $P_2O_5$ with milk of lime, I get a satisfactorily available precipitate which after filtering, washing, and drying, contains about 40% $P_2O_5$ soluble in standard ammonium citrate solution.

A principal advantage of my method is that a considerable part of the calcium required for precipitation is added as cheap calcium carbonate; a further advantage is that less heat is generated by the reaction than is the case when all of the lime is added as milk of lime, and the cooler condition of the solution tends to promote formation of available, rather than non-available phosphates.

It will be understood that many of the details concerning proportions, temperatures, etc., are subject to considerable variation without departing from the spirit of my invention, as disclosed in the appended claims.

Having thus described my invention, what I claim and desire to secure by Letters Patent is—

1. The process for utilizing gaseous hydrochloric acid and producing available di-calcium phosphate, which consists in bringing gaseous hydrochloric acid into contact with a water suspension of pulverized phosphate rock, thereby decomposing the phosphate rock and taking into solution phosphoric acid and mono calcium phosphate;

adding calcium carbonate to this solution to neutraliz the first hydrogen ion of its free phosphoric acid and its hydrochloric acid, then precipitating di-calcium phosphate with calcium hydroxid, and separating the precipitate from the solution.

2. The step in the process for producing di-calcium phosphate from solutions containing mono calcium phosphate, phosphoric acid and hydrochloric acid, which consists in adding calcium carbonate to neutralize the hydrochloric acid and the first hydrogen ion of the free phosphoric acid, then precipitating the di-calcium phosphate by adding calcium hydroxid, and separating the precipitate from the solution.

ROBERT D. PIKE.